United States Patent
Toyota et al.

[11] Patent Number: 5,939,363
[45] Date of Patent: Aug. 17, 1999

[54] ROLLING-CONTACT BEARING AND METHOD OF FORMING FILM OF LUBRICANT

[75] Inventors: Hiroshi Toyota; Kazunori Hayashida; Hiroaki Takebayashi, all of Osaka, Japan

[73] Assignee: Koyo Seiko Co., Ltd., Osaka, Japan

[21] Appl. No.: 08/836,258

[22] PCT Filed: Sep. 10, 1996

[86] PCT No.: PCT/JP96/02578

§ 371 Date: Jul. 3, 1997

§ 102(e) Date: Jul. 3, 1997

[87] PCT Pub. No.: WO97/12156

PCT Pub. Date: Apr. 3, 1997

[30] Foreign Application Priority Data

Sep. 11, 1995 [JP] Japan .................................. 7-232608
Sep. 9, 1996 [JP] Japan .................................. 8-237501

[51] Int. Cl.⁶ ..................... C10M 107/40; C10M 107/38
[52] U.S. Cl. ............................................ 508/106; 508/104
[58] Field of Search ...................... 508/104, 106

[56] References Cited

U.S. PATENT DOCUMENTS

| 3,344,064 | 9/1967 | Brady et al. | 508/104 |
| 3,652,409 | 3/1972 | Mack et al. | 508/104 |
| 4,432,883 | 2/1984 | Denzine et al. | 508/104 |

FOREIGN PATENT DOCUMENTS

| 62-246621 | 10/1987 | Japan . |
| 63-76909 | 4/1988 | Japan . |

*Primary Examiner*—Ellen M. McAvoy
*Attorney, Agent, or Firm*—Birch, Stewart, Kolasch & Birch, LLP

[57] ABSTRACT

A solid film of a fluorine-containing polyurethane polymer is formed on at least one of the constituent elements (inner and outer rings, rolling member and retainer) of a rolling-contact bearing. The molecules of the solid film of the fluorine-containing polyurethane polymer have urethane bonds, and form a three-dimensional reticular structure. Therefore, the film is unlikely to separate, peel off or wear. The occurrence of the dust can be restricted, and lubrication property can be improved.

16 Claims, 6 Drawing Sheets

Duration of rotation (h)
(□ Fa:25N, + Fa:50N)

ROLLING-CONTACT BEARING AND METHOD OF FORMING FILM OF LUBRICANT

TECHNICAL FIELD

The present invention relates to a roller bearing and a process of forming lubricating film therefor. The roller bearing will prove its merits when used in a vacuum, a clean atmosphere, or a corrosive environment in which ordinary grease and oil cannot be used.

BACKGROUND ART

One of the above-mentioned special instances is the conveyor in the semiconductor fabricating system. Grease is not adequate beause it evaporates to deteriorate the lubricating performance and to contaminate the working environment. A common way of coping with this situation has been to coat the raceway surface of the bearing ring, the surf ace of the rolling element, and/or the surface of the cage pocket with soft metal (such as gold, silver, lead, and copper) or solid lubricant (such as carbon and molybdenum disulfide) in the form of film.

The coating film of solid lubricant has the disadvantage of gradually peeling off while the rolling element is rotating or sliding. Although the coating film evolves less dust than the grease, the resulting dust is detrimental to the clean working environment. In addition, the amount of dust increases under the high-load conditions.

The present inventors' experience in coating the bearing ring and cage with a solid lubricant of fluoroplastic containing a binder revealed that this solid lubricant evolves much less dust than the conventional one. Nevertheless, the coating film of this solid lubricant is still subject to peeling and dropping (evolving dust) under a comparatively large axial load. The result of peeling and dropping is the decreased lubricating function and the direct contact between metals, which leads to adhesion, wear, and short life. In addition, with the coating film peeled off or dropped, the bearing is subject to corrosion in a corrosive environment.

It is an object of the present invention to provide a means to reduce the evolution of dust from a rolling bearing, thereby improving its lubricating performance and prolonging its life.

DISCLOSURE OF THE INVENTION

[Constitution] The first aspect of the present invention resides in a roller bearing which is characterized in that at least one of its constituents is coated with a solid film formed from a fluorine-containing polyurethane.

Incidentally, the solid film should preferably be one which has the three-dimensional network structure. In addition, the solid film should preferably be incorporated with a mobile fluoropolymer dispersed therein. The mobile fluoropolymer should preferably be one which has no functional groups.

The second aspect of the present invention resides in a process of forming a lubricating film on a roller bearing.

The first embodiment of the process comprises the steps of dissolving in a solvent a fluoropolymer having isocyanate groups as functional groups, applying the solution to at least one of the constituents of a roller bearing, thereby forming a liquid film thereon, and curing the liquid film, thereby forming a solid film of fluorine-containing polyurethane of network structure.

The second embodiment of the process comprises the steps of dissolving in a solvent a mixture of a fluoropolymer having isocyanate groups as functional groups and a fluoropolymer having at least one kind of hydroxyl group, amino group, and carboxyl group, applying the solution to at least one of the constituents of a roller bearing, thereby forming a liquid film thereon, and curing the liquid film, thereby forming a solid film of fluorine-containing polyurethane of network structure.

The third embodiment of the process comprises the steps of dissolving in a solvent a fluoropolymer having isocyanate groups as functional groups alone or in combination with a fluoropolymer having at least one kind of hydroxyl group, amino group, and carboxyl group, adding the solution to a solution of a fluoropolymer having no functional groups, applying the solution to at least one of the constituents of a roller bearing, thereby forming a liquid film thereon, and curing the liquid film, thereby forming a solid film of fluorine-containing polyurethane of network structure in which the fluoropolymer having no functional groups is dispersed in the mobile state.

The above-mentioned fluoropolymer may include perfluoropolyether having no functional groups.

[Functions] The fluorine-containing polyurethane mentioned above forms a solid film in which molecules are tightly connected to one another. Therefore, the solid film is hardly liable to peeling and wearing due to friction between the rolling and sliding elements of the roller bearing. This leads to reduction in rolling and sliding resistance.

In the third embodiment of the process, the fluoropolymer remaining mobile in the solid film of the fluorine-containing polyurethane oozes out to contribute to the lubricating function.

[Effects] The roller bearing of the present invention has an advantage over conventional ones because it has a solid coating film of fluorine-containing polyurethane which is less liable to peeling, dropping, and wearing and hence is capable of reducing rolling and sliding resistance. The solid coating film contributes to lubricating performance, stable operation, and prolonged life. Therefore, it will find use in the semiconductor manufacturing plant where precision fabrication is required. Moreover, it will contribute to the improved yields of semiconductors because it hardly contaminates the clean working environment.

BEST MODE FOR CARRYING OUT THE INVENTION

The present invention will be described in more detail with reference to the examples (shown in FIGS. 1 to 8). FIG.

Figure 2A:
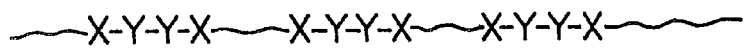
FIG. 2 is a schematic diagram showing the molecular structure of the solid film of fluorine-containing polyurethane formed on the roller bearing shown in FIG. 1.
Figure 2B:
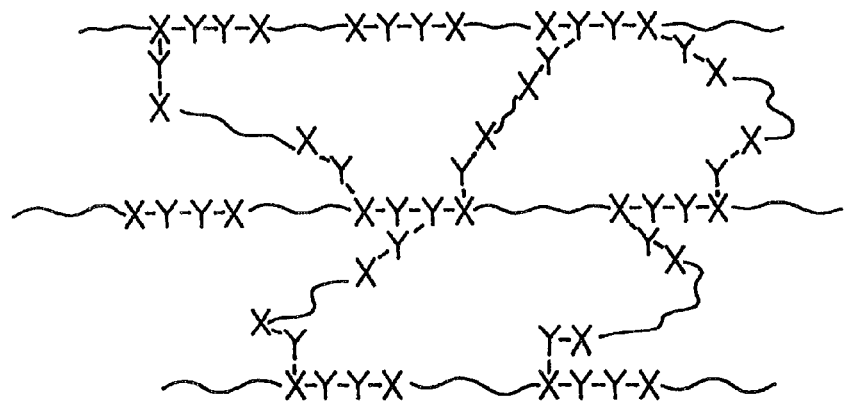
Figure 3:
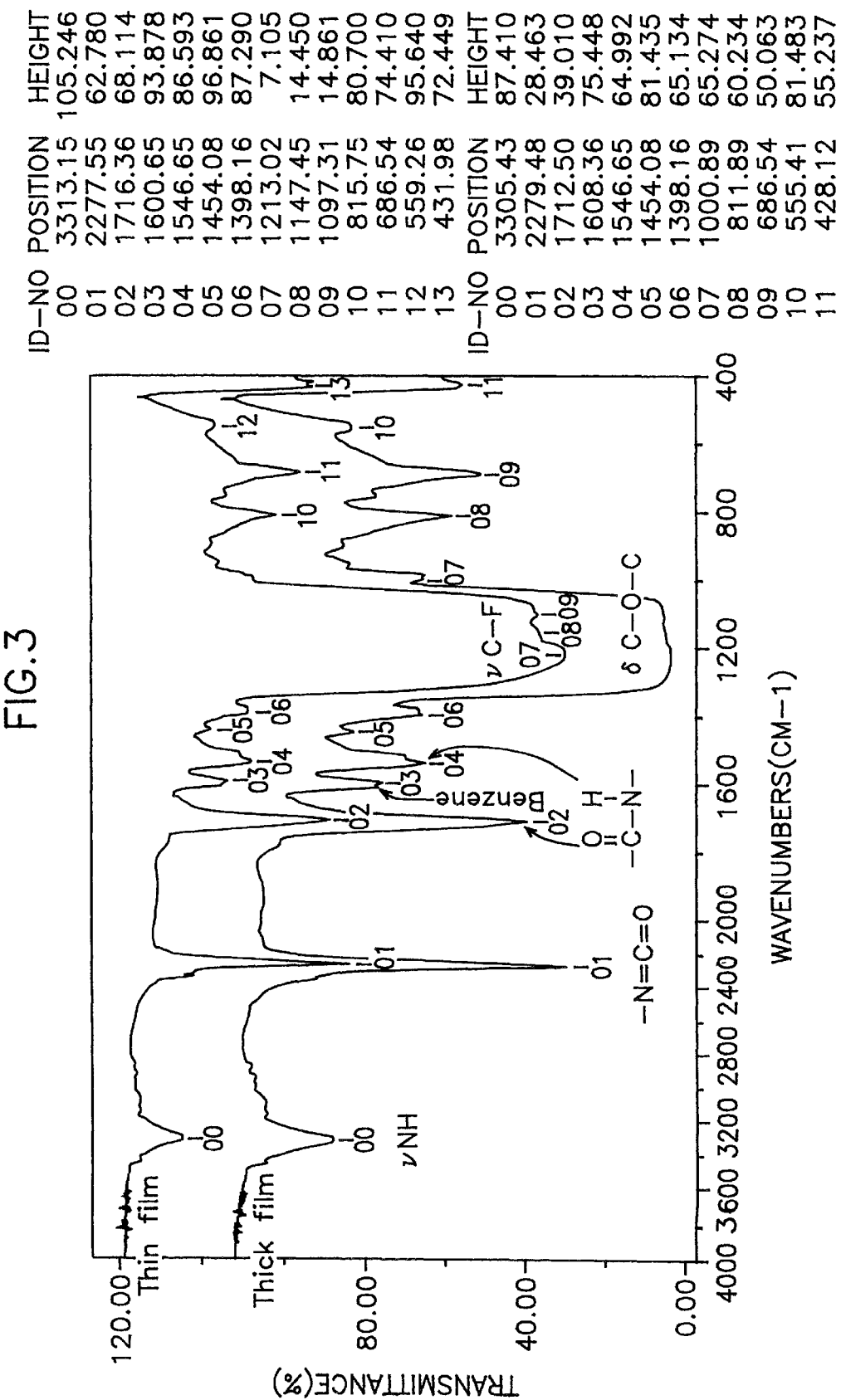
FIG. 3 is an absorption spectrum of the solid film of the fluorine-containing polyurethane which is not yet cured.
Figure 4:
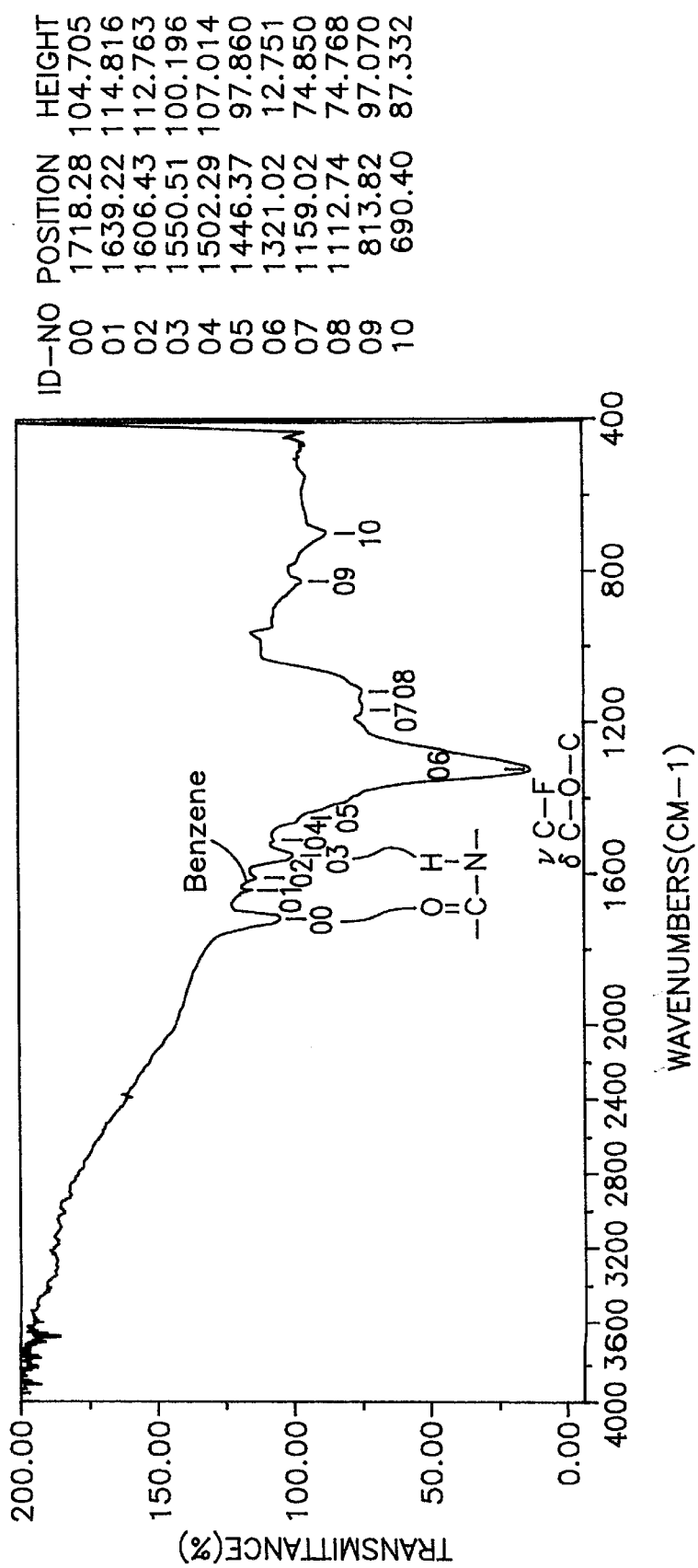
FIG. 4 is an absorption spectrum of the solid film of the fluorine-containing polyurethane which has been cured.
Figure 5:
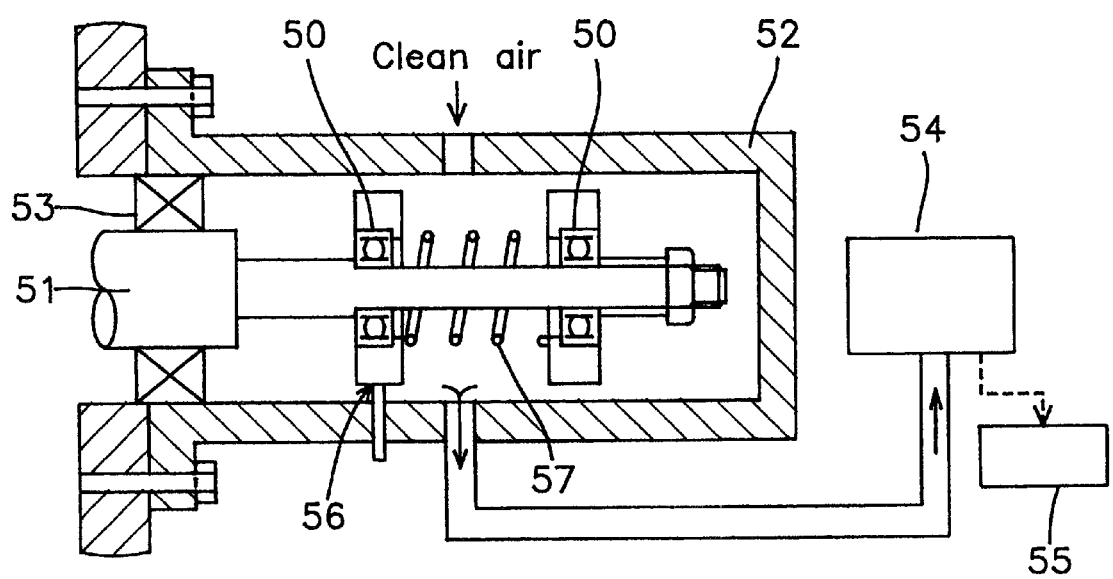
FIG. 5 is a schematic diagram showing a machine for testing samples in the atmosphere.
Figure 6:
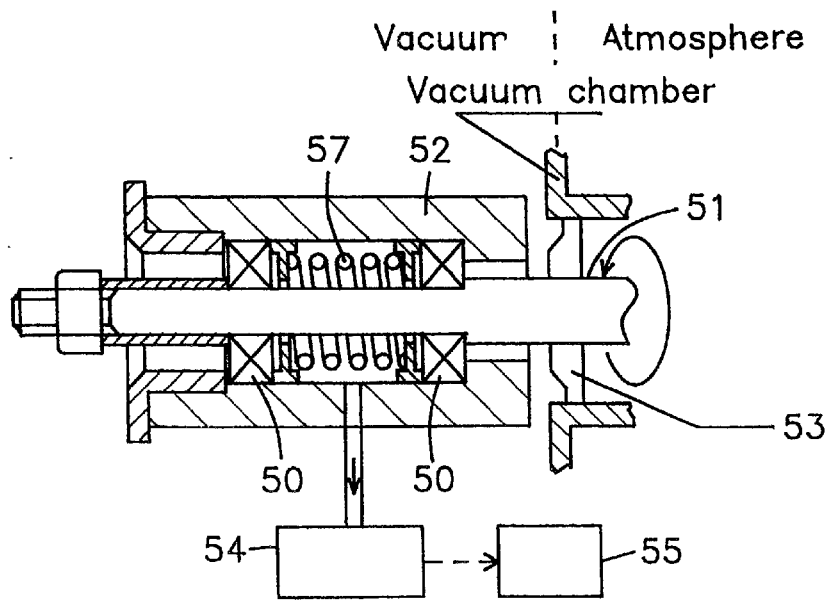
FIG. 6 is a schematic diagram showing a machine for testing samples in a vacuum.
Figure 7:
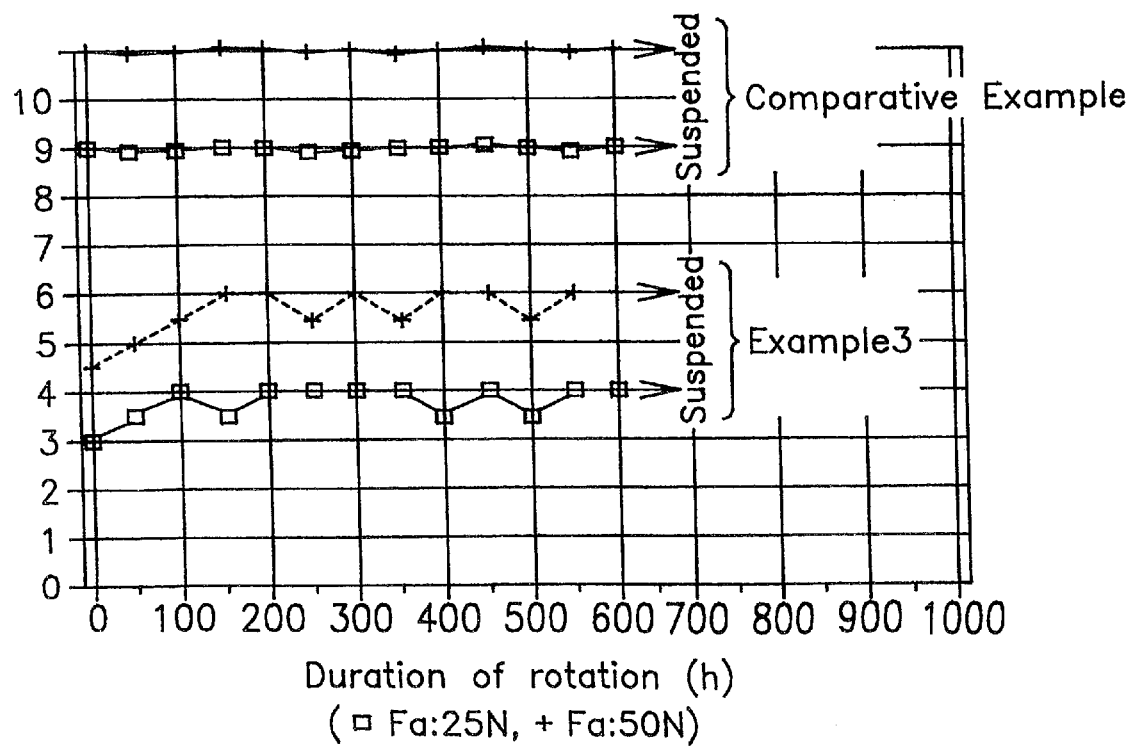
FIG. 7 is a graph showing the results of test for torque life.
Figure 8:
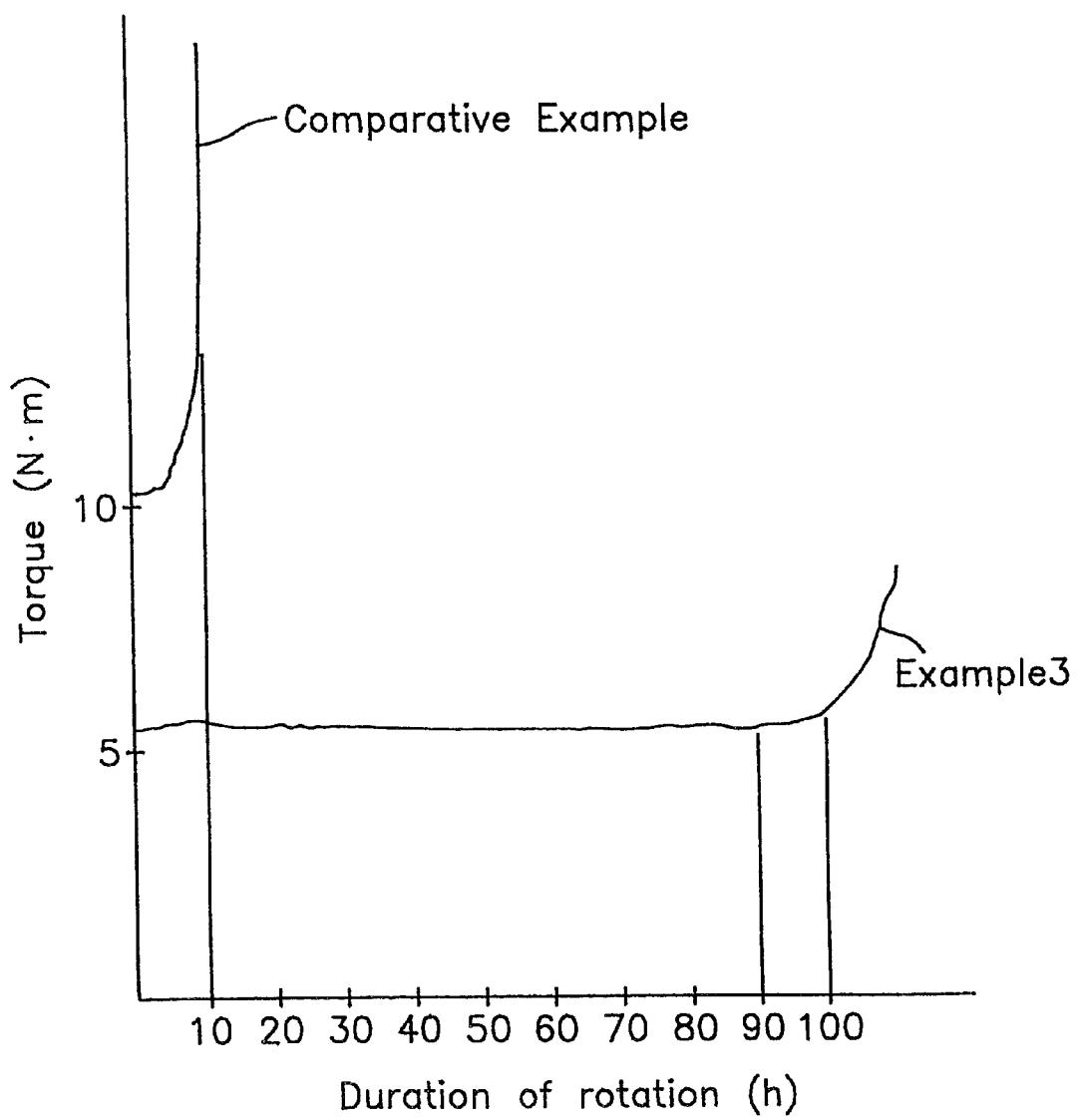
FIG. 8 is a graph showing the results of another test for torque life.

1 is a vertical sectional view showing the upper half of the roller bearing. FIG. 2 is a schematic diagram showing the molecular structure of the solid film of fluorine-containing polyurethane formed on the roller bearing shown in FIG. 1. FIG. 3 is an absorption spectrum of the solid film of the fluorine-containing polyurethane which is not yet cured. FIG. 4 is an absorption spectrum of the solid film of the fluorine-containing polyurethane which has been cured. FIG. 5 is a schematic diagram showing a machine for testing samples in the atmosphere. FIG. 6 is a schematic diagram showing a machine for testing samples in a vacuum. FIG. 7 is a graph showing the results of test for torque life. FIG. 8 is a graph showing the results of another test for torque life.

Figure 1:
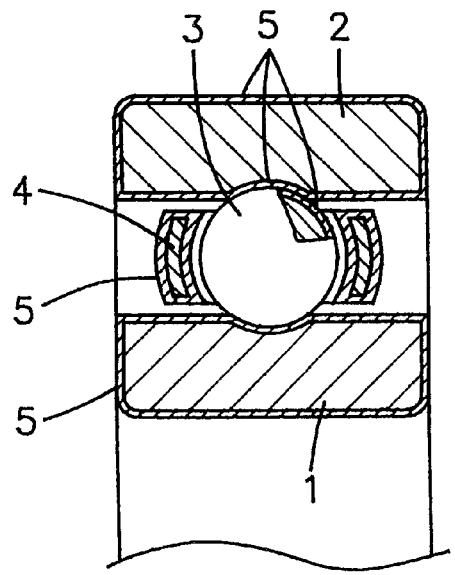
FIG. 1 is a vertical sectional view showing the upper half of the roller bearing pertaining to one embodiment of the present invention.

The roller bearing (such as deep groove ball bearing) shown in FIG. 1 is made up of an inner ring (1), an outer ring (2), spherical rolling elements (3), a wavy press-formed cage (4), and a solid film of fluorine-containing polyurethane (5).

The inner and outer rings (1, 2), the rolling elements (3), and the cage (4) are made of corrosion-resistant material, such as JIS SUS440 (martensitic stainless steel) and JIS SUS630 (precipitation hardening stainless steel which has undergone hardening heat treatment). JIS SUS304 (austenitic stainless steel) may be acceptable for light-load applications.

The corrosion-resistant metal for the inner and outer rings (1, 2) and the rolling elements (3) may be replaced by ceramics, such as silicon nitride ($Si_3N_4$), alumina ($Al_2O_3$), silicon carbide (SiC), zirconia ($ZrO_2$), and aluminum nitride (AlN). The first one is used in combination with a sintering aid such as yttria ($Y_2O_3$), alumina ($Al_2O_3$), aluminum nitride (AlN), titanium oxide ($TiO_2$), and spinel ($MgAl_2O_4$).

The cage (4) may be made of JIS SUS304 as well as brass and titanium. It may also be made of synthetic resins, such as polytetrafluoroethylene (PTFE), ethylene-tetrafluoroethylene (ETFE), polyether-ether ketone (PEEK), polyphenylenesulfide (PPS), polyethersulfone (PES), and nylon 46. These synthetic resins may contain glass fiber for reinforcement. The cage (4) may take on a wavy form as well as a crown shape etc.

The inner and outer rings (1, 2), the rolling elements (3), and the cage (4) have their entire surface coated with the solid film (5) of the fluorine-containing polyurethane explained below.

The fluorine-containing polyurethane is composed of repeating units represented by the formula $—C_xF_{2x}—O—$ (where x is an integer of 1 to 4). It has an average molecular weight of millions and takes on the three-dimensional network structure with molecules connected through urethane linkage by the curing reaction. The three-dimensional network structure is a term used to express the chemical structure but it does not imply that the cross section of the film looks like a net. It denotes a structure in which molecules are uniformly and densely connected to one another like a network. Such a structure is formed by modifying the chemical structure with a fluoropolymer having terminal isocyanate functional groups as shown in Formula (1) below.

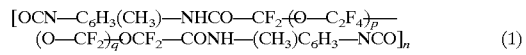

$$[OCN—C_6H_3(CH_3)—NHCO—CF_2\!-\!(O—C_2F_4)_{\overline{p}}\!-\!(O—CF_2)_{\overline{q}}OCF_2—CONH—(CH_3)C_6H_3—NCO]_n \quad (1)$$

An example of the fluoropolymer having terminal isocyanate functional groups is a derivative of perfluoropolyether (PFPE).

The solid film (5) of the fluorine-containing polyurethane is formed in the following way.
(a) Dipping: A solution (1 mass %) of fluorine-containing polyurethane is prepared by dissolving a derivative of per-fluoropolyether in a fluorine-based solvent (SV90D). In this solution are dipped the inner and outer rings (1, 2), the rolling elements (3), and the cage (4) separately or in the form of assembly. (In the second case, the bearing is rotated several times in the solution.)
(b) Drying: Dipping is followed by heating at 40–50° C. for about 1 minute for solvent removal. The coating film remains mobile in this stage.
(c) Curing: The coating film is cured by heating at 100–200° C. for 20 hours so that the liquid film chemically changes into the solid film (5) of fluorine-containing polyurethane.

The curing reaction causes the molecules of fluorine polymer to form the network structure through urethane linkage with the elimination of terminal isocyanate groups (NCO) according to the following four chemical reactions (Formulas 2 to 5). The urethane linkage extends the molecules as shown in FIG. 2(a) and then forms the three-dimensional crosslinks as shown in FIG. 2(b).

Incidentally, the molecule represented by formula (1) is represented by Y-X~X-Y in FIG. 2, X and Y denoting NHCO and NCO, respectively, in Formula (1).

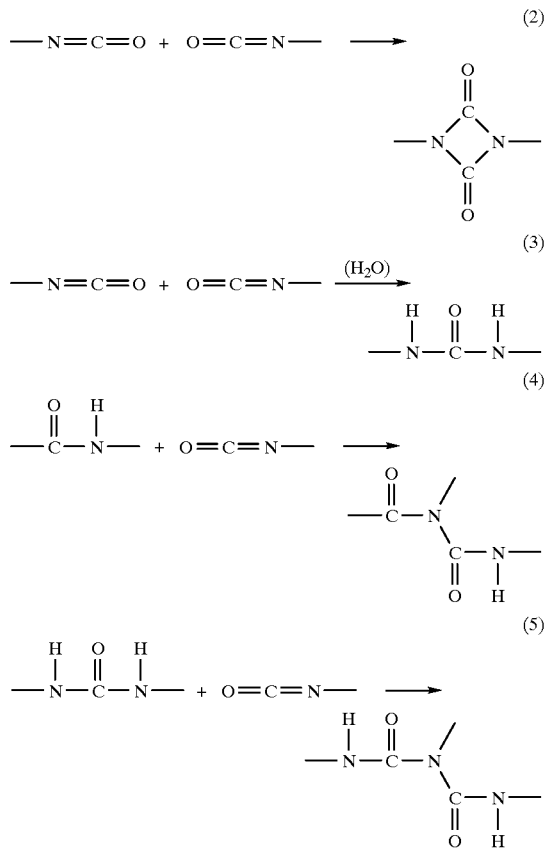

The above-mentioned procedure makes it possible to form the solid film of fluorine-containing polyurethane in an adequate thickness on the constituents of the roller bearing. According to the use of the bearing, the thickness of the solid film may be adjusted in the range of 0.1 to 3 $\mu$m by repeating the steps (a) and (b) above as many times as necessary.

To examine the effect of curing, the following experiments were conducted. In the first experiment, the solution obtained in step (a) was simply dried and the resulting film (still mobile) was analyzed by Fourier transform infrared spectroscopy (FT-IR, liquid film method). The sample gave a spectrum shown in FIG. 3. There are peaks due to NH (3300 cm$^{-1}$), N=C=O (2279 cm$^{-1}$), N(H)C=O (1712 cm$^{-1}$, 1546 cm$^{-1}$), and benzene (1600 cm$^{-1}$) in addition to peaks due to fluorocarbon. These peaks suggest the presence of benzene rings, urethane linkages, and isocyanate groups. The spectrum is the same regardless of the thickness of the film. In the second experiment, the above-mentioned solution was applied to a stainless steel sheet and the coating film was cured. The cured film was analyzed by Fourier transform infrared spectroscopy (FT-IR, reflection method). The sample gave a spectrum shown in FIG. 4. There are peaks due to benzene rings and urethane linkages, but there are no peaks due to isocyanate. These results support the chemical changes of functional groups by curing as shown in Formulas 2 to 5 above.

The solid film (5) of the fluorine-containing polyurethane has the three-dimensional network structure, densely covers the substrate, and exhibits the self-lubricating properties. Therefore, it prevents the bearing constituents from coming into direct contact with each other and it does not wear, peel off, and evolve dust while the roller bearing is running.

According to another embodiment of the present invention, the solid film (5) of the fluorine-containing polyurethane is formed such that mobile molecules of a fluoropolymer (such as fluoropolyether) are dispersed in the three-dimensional network structure of urethane linkage. This solid film may be formed from a solution of a fluorine-containing polymer having terminal isocyanate functional groups and a fluoropolymer having no functional groups. Since these two polymers do not combine with each other in the curing stage (c), the latter remains mobile in the solid film (5) and oozes out from the solid film (5) to contribute to the lubricating action. The fluorine-containing polymer may contain functional groups as shown in Formulas 6 to 8 below.

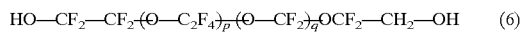

HO—CF$_2$—CF$_2$-(O—C$_2$F$_4$)$_p$-(O—CF$_2$)$_q$OCF$_2$—CH$_2$—OH (6)

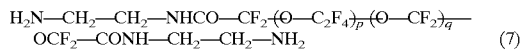

H$_2$N—CH$_2$—CH$_2$—NHCO—CF$_2$-(O—C$_2$F$_4$)$_p$-(O—CF$_2$)$_q$-OCF$_2$—CONH—CH$_2$—CH$_2$—NH$_2$ (7)

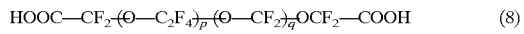

HOOC—CF$_2$-(O—C$_2$F$_4$)$_p$-(O—CF$_2$)$_q$OCF$_2$—COOH (8)

Examples 1 to 4 and Comparative Example 1 that follow demonstrate the effect of the solid film of fluorine-containing polyurethane on dust evolution and torque life.

In Examples 1 to 4, the solid film (1 μm thick) of fluorine-containing polyurethane is formed on the entire surface of the inner and outer rings, rolling elements, and cage.

In Example 1, the fluorine-containing polyurethane which has isocyanate groups as terminal functional groups.

In Example 2, the fluorine-containing polyurethane is a mixture of a fluorine-containing polyurethane which has isocyanate groups as terminal functional groups, and a fluorine-containing polyurethane which has hydroxyl groups (—OH) as terminal functional groups.

In Example 3, the fluorine-containing polyurethane is a mixture of a fluorine-containing polyurethane which has isocyanate groups as terminal functional groups, and a fluorine-containing polyurethane which has no functional groups.

In Example 4, the fluorine-containing polyurethane is a mixture of a fluorine-containing polyurethane which has isocyanate groups as terminal functional groups, a fluorine-containing polyurethane which has hydroxyl groups (—OH) as terminal functional groups, and a fluorine-containing polyurethane which has no functional groups.

In Comparative Example 1, a solid coating film (1 μm thick) of polyimide (containing polytetrafluoroethylene (PTFE) dispersed therein) is formed on the entire surface of the inner and outer rings and cage. This coating film is composed of polyimide (which is a comparatively hard and dense thermoplastic resin) as the matrix and polytetrafluoroethylene as dispersed particles. Bond between the two components is weak.

The samples are tested in the atmosphere using the apparatus shown in FIG. 5 and in a vacuum using the apparatus shown in FIG. 6. In FIGS. 5 and 6, there are shown bearing samples (50, 50), a rotating shaft (51), a casing (52), a magnetic fluid seal (53), a dust particle counter (54), a recorder (55), a bearing housing (56), and a coil spring to exert an axial load (57).

In both Example and Comparative Example, the bearing sample is SE608 (φ8×φ22×7), with inner and outer rings made of JIS SUS440C and cage (wavy type) made of JIS SUS304. The raceway of the inner and outer rings has a surface roughness of 0.1 Z, and the rolling element has a surface roughness of 0.05 a. Test conditions are as follows:

Rotary speed: 200 rpm

Load: axial load (20 N, 25 N, 50 N, 100 N)

Atmosphere: Clean bench (class 10) Vacuum (2.6×10$^{-4}$ Pa or less)

Temperature: room temperature, high temperature (200° C.)

Particle counting: Particles (dust) larger than 0.1 μm

The bearing samples were tested for time required for the particle (dust) counting reaches a prescribed number and also tested for time required for the torque to reach a prescribed level.

(1) Dust counting test: In this test, the bearing is run in the atmosphere at room temperature under a load of 100 N, and time required for the counting of particles (dust) to exceed 1000/0.1 cf. Measurements are repeated 10 times at intervals of 10 minutes. The coating film is made from the solution specified below.

In Example 1: a fluorine-containing polyurethane which has isocyanate groups as terminal functional groups, 1 mass %.

In Example 2: a fluorine-containing polyurethane which has isocyanate groups as terminal functional groups, 1 mass %; a fluorine-containing polyurethane which has hydroxyl groups (—OH) as terminal functional groups, 0.25 mass %.

In Example 3: a fluorine-containing polyurethane which has isocyanate groups as terminal functional groups, 1 mass %; a fluorine-containing polyurethane which has no functional groups, 0.25 mass %.

In Example 4: a fluorine-containing polyurethane which has isocyanate groups as terminal functional groups, 1 mass %; a fluorine-containing polyurethane which has hydroxyl groups (—OH) as terminal functional groups and a fluorine-containing polyurethane which has no functional groups, 0.25 mass % in total.

The results are as follows:

Example 1 . . . 6 hours

Example 2 . . . 10 hours

Example 3 . . . 31 hours

Example 4 . . . 30 hours

Comparative Example 1 . . . 4 hours

It is noted that Example 1 in which a fluorine-containing polyurethane which has isocyanate groups as terminal functional groups, is used alone as the fluorine-containing polyurethane is superior to Comparative Example 1 but is inferior to Examples 2 to 3 in which a fluorine-containing polyurethane which has isocyanate groups as terminal functional groups, is used in combination with a mobile fluoropolymer.

The good results in Examples 1 to 4 are due to the fact that the solid film (5) of fluorine-containing polyurethane is a dense, uniform film of three-dimensional structure and hence is less liable to peeling and wearing while the constituents of the roller bearing are rolling and sliding.

The results of the dust counting test under different axial loads are as follows.

| Axial load | 50N | 20N |
| --- | --- | --- |
| Example 3 | 120 h | 335 h |
| Example 4 | 115 h | 320 h |

This holds true also for Examples 1 and 2. In Comparative Example 1, the result of the dust counting test is improved from 4 hours (under a load of 100 N) to 10 hours (under a load of 50 N). This result is still much poorer than that in Example 3. Therefore, it is recommended that any of the solid films specified in Examples 1 to 4 should be selected according to the operating conditions.

It is concluded from the foregoing that the solid film (5) should preferably be formed from a fluorine-containing polymer having terminal isocyanate functional groups in combination with a mobile fluoropolymer. The mobile fluoropolymer should preferably be one which has no functional groups.

To examine the effect of concentration, the dust counting test (under a load of 100 N) was carried out in such a way that the concentration of a fluorine-containing polyurethane which has isocyanate groups as terminal functional groups, (as the base material) was 1 mass % and the concentration of a fluorine-containing polyurethane which has no functional groups (as the secondary material) was 0.25 mass % or 0.5 mass %. The results were 31 hours for 0.25 mass % and 22 hours for 0.5 mass %, with the former concentration being desirable. In practice, the concentration of a fluorine-containing polyurethane which has no functional groups may range from 0.1 to 0.75 mass %, and the concentration of a fluorine-containing polyurethane which has isocyanate groups as terminal functional groups, may range from 1 to 10 mass %. It is desirable to use them in a certain ratio regardless of the concentration. Time in the dust counting test tends to decrease as the concentration of a fluorine-containing polyurethane which has isocyanate groups as terminal functional groups, (as the base material) increases.

(2) Torque test: This test was performed on the samples in Example 3 and Comparative Example 1 in a vacuum at room temperature under an axial load of 25 N or 50 N. The results are shown in FIG. 7. (The test was suspended after 600 hours.) It is apparent that the coating reduces torque by nearly half as summarized below.

| Axial load | 25N | 50N |
| --- | --- | --- |
| Example 3 | 3–4 N · m | 5–6 N · m |
| Comparative Example 1 | 8–10 N · m | 12–15 N · m |

Almost the same results as above were obtained with samples in Examples 1 and 2.

The torque test was also carried out in a vacuum at 200° C. under an axial load of 50 N. The result is shown in FIG. 8. It is noted that the sample in Comparative Example 1 showed a sharp increase in torque after 10 hours, whereas the sample in Example 3 remained unchanged in torque over 90 hours. This result suggests that the coating film prolongs the life of the bearing regardless of temperature. The reason for this is that the two components for the coating film do not combine with each other but remain mobile and exhibit the lubricating action.

The present invention is not limited to the above-mentioned examples; but various changes and modifications may be made as follows.

(1) The deep groove ball bearing used in Examples may be replaced by roller bearings of any other type which may not have the cage.

(2) The curing may be carried out by irradiation (with ultraviolet rays, infrared rays, gamma rays, or electron rays) in place of heating.

(3) The step of drying may be omitted.

(4) It is not always necessary to coat all the constituents of the bearing; but it is possible to limit the coating to the inner and outer rings (1,2) or the rolling elements (3) alone.

(5) It is not always necessary to coat the entire surface of the constituents of the bearing; but it is possible to limit the coating to the raceway surface of the inner and outer rings (1,2) or that part of the cage (4) which comes into contact with the rolling elements (3). Such partial coating may be accomplished by masking prior to dipping. However, the entire coating is desirable for corrosion prevention and obviates the necessity of anticorrosive treatment.

We claim:

1. A roller bearing which is characterized in that at least one of its constituents is coated with a solid film formed from a fluorine-containing polyurethane polymer.

2. A roller bearing as defined in claim 1, wherein the solid film has a three-dimensional network structure.

3. A roller bearing as defined in claim 1 or 2, wherein the solid film contains a mobile fluoropolymer dispersed therein.

4. A roller bearing as defined in claim 3, wherein the mobile fluoropolymer has no functional groups.

5. A process of forming a lubricating film on a roller bearing, said process comprising the steps of dissolving in a solvent a fluoropolymer having isocyanate groups as functional groups, applying the solution to at least one of the constituents of a roller bearing, thereby forming a liquid film thereon, and curing the liquid film, thereby forming a solid film of fluorine-containing polyurethane polymer of network structure.

6. A process of forming a lubricating film on a roller bearing, said process comprising the steps of dissolving in a solvent a mixture of a fluoropolymer having isocyanate groups as functional groups and a fluoropolymer having at least one of a hydroxyl group, an amino group, and a carboxyl group, applying the solution to at least one constituent of a roller bearing, thereby forming a liquid film thereon, and curing the liquid film, thereby forming a solid film of fluorine-containing polyurethane polymer of network structure.

7. A process of forming a lubricating film on a roller bearing, said process comprising the steps of dissolving in a solvent a fluoropolymer having isocyanate groups as functional groups alone or in combination with a fluoropolymer having at least one of a hydroxyl group, an amino group, and a carboxyl group, adding the solution to a solution of a fluoropolymer having no functional groups, applying the solution to at least one constituent of a roller bearing, thereby forming a liquid film thereon, and curing the liquid film, thereby forming a solid film of fluorine-containing polyurethane polymer of network structure in which the fluoropolymer having no functional groups is dispersed in a mobile state.

8. The roller bearing according to claim 1, wherein said solid film comprises a fluoropolymer having an isocyanate group.

9. A roller bearing according to claim 8, wherein solid film comprises a mixture of a fluoropolymer having an isocyanate group and a fluoropolymer having a hydroxyl group, an amino group, or a carboxyl group as a terminal functional group.

10. The roller bearing according to claim 9, wherein said solid film further comprises a fluoropolymer having no functional group.

11. The roller bearing according to claim 8, wherein said solid film comprises 1–10 mass % of a fluoropolymer having an isocyanate group.

12. The roller bearing according to claim 10, wherein said solid film comprises 1–10 mass % of a fluoropolymer having an isocyanate group, and 0.1 to 0.75 mass % of a fluoropolymer having no functional group.

13. The process according to claim 5, wherein said solid film comprises 1–10 mass % of a fluoropolymer having an isocyanate group.

14. The process according to claim 7, wherein said solid film comprises 1–10 mass % of a fluoropolymer having an isocyanate group, and 0.1 to 0.75 mass % fluoropolymer having no functional group.

15. The roller bearing as defined in claim 1, wherein said solid film is formed by curing a liquid film comprising the fluorine-containing polyurethane polymer by heating at 100–200° C. for 20 hours.

16. The process according to claim 5, wherein said liquid film is cured by heating at 100–200° C. for 20 hours.

* * * * *